United States Patent [19]
Major et al.

[11] Patent Number: 5,388,413
[45] Date of Patent: Feb. 14, 1995

[54] PORTABLE NITROGEN SOURCE

[76] Inventors: Thomas O. Major, 4105 Gray, Denver, Colo. 80212; Jack E. Major, Jr., 1590 Harlan, Lakewood, Colo. 80214

[21] Appl. No.: 7,205

[22] Filed: Jan. 22, 1993

[51] Int. Cl.$^6$ ............................................. F25J 3/00
[52] U.S. Cl. ............................................. 62/11; 95/54
[58] Field of Search .................. 62/50.3, 8, 9, 11; 95/52, 54

[56] References Cited

U.S. PATENT DOCUMENTS

| | | | |
|---|---|---|---|
| 3,229,472 | 1/1976 | Beers | 62/50.3 |
| 3,802,216 | 4/1974 | Brandimarte | 62/457.1 |
| 4,881,953 | 11/1989 | Prasad et al. | 95/54 |

OTHER PUBLICATIONS

Medal, L. P. (Dupont), paper, *Helicopter OBIGGS*, May 1991.

Generon Systems (Dow Chemical Co. & The BOC Group) product brochure, *The Gold Line Membrane Modules for Nitrogen Production*, date unknown.

Permea, Inc. product brochure, *NiVox Nitrogen Systems*, date unknown.

*Primary Examiner*—Ronald C. Capossela
*Attorney, Agent, or Firm*—J. Preston Oxenham

[57] ABSTRACT

A nitrogen gas source for providing nitrogen gas at sequential work sites includes a channel for containing flowing gas at a pressure greater than ambient atmospheric pressure. A compressor provides compressed air at a pressure greater than atmospheric pressure to an up-stream end of the channel. A central portion of the channel includes a nitrogen module with a membrane wall portion for selectively constraining nitrogen within the channel while allowing other gases to escape from the channel through the membrane. A downstream portion of the channel includes a bifurcated channel section with a first bifurcated section passage having a first flow restrictor and second bifurcated section passage having a second flow restrictor. A two position valve allows flowing gas to be selectively directed through the first or second passage. The compressor, module and channel are mounted within a cabinet in fixed, functional relation and a handle is provided on the top of the cabinet to facilitate transport between work sites.

4 Claims, 3 Drawing Sheets

PORTABLE NITROGEN SOURCE

TECHNICAL FIELD

The present invention relates to providing nitrogen gas for use in performing tasks at remote work sites. More particularly, the present invention relates to apparatus for providing nitrogen gas at a series of remote work sites over time. Most particularly, the present invention relates to apparatus for providing a portable source of nitrogen gas which may be conveniently transported from one work site to another for use during repair work on refrigeration systems.

BACKGROUND OF THE INVENTION

Due to its inert properties, nitrogen gas has long been a widely used industrial gas. Industrial applications have included packaging of perishable foods and blanketing of such foods in storage, provision of none explosive atmospheres and reducing atmospheres for soldering and brazing, and purging of explosive gas atmospheres from tanks and pipes prior to welding operations.

Traditionally, nitrogen has been produced by distillation of liquified air, and has been provided to industrial users in high pressure canisters. Typically, these canisters are large and heavy. While nitrogen gas is generally readily available and inexpensive, transportation, storage and rental of nitrogen gas containers can be costly for the industrial user. Also, there is always some danger associated with transportation and handling of high pressure gases. In applications where nitrogen gas must be used in remote locations, the danger, cost and inconvenience of transporting and handling large, heavy, high pressure containers is compounded. An example of such situations is the on site repair of refrigeration systems during which nitrogen gas may be used for purging of refrigeration systems before brazing operations, charging systems for leak checking, and for breaking vacuums in large chillers.

Recently, nitrogen gas has bee produced utilizing selectively permeable membranes, such as membranes developed by Dow Chemical Company. To produce nitrogen gas, pressurized air is passed through thin hollow fibers fabricated of the selectively permeable membrane material, oxygen, water and other gases permeate through the membrane wall of the fibers more rapidly than nitrogen, leaving a stream of substantially pure nitrogen after flowing a sufficient distance through the fibers.

This method has been used to produce nitrogen on an industrial scale for subsequent distribution in traditional, high pressure canisters. More recently, membrane nitrogen systems have been available for on site installation by industrial users of nitrogen gas. These systems are generally large and operate upon compressed air available from plant systems on location or separate dedicated compressors. Smaller units have been available for specialized applications, such as blanketing aircraft fuel tanks, and have relied upon local sources of compressed air, such as bleed air from a turbine engine compressor.

No system of the prior art has provided a complete, compact, readily transportable, safe nitrogen source which can provide substantially pure nitrogen for general purpose use at remote locations.

DISCLOSURE OF THE INVENTION

It is an object of the present invention to provide a source of high quality nitrogen gas for general purpose use which may easily be transported to remote locations.

It is also an object of the present invention to provide large volumes of high quality nitrogen gas at remote locations without need to transport numerous containers to the location.

It is a further object of the present invention to provide high quality nitrogen gas at remote locations economically.

It is yet another object of the present invention to provide high quality nitrogen gas at remote locations safely.

A nitrogen gas source comprising an embodiment of the present invention includes an air compressor for compressing air drawn from the ambient atmosphere and an after-cooler for cooling the stream of compressed air produced by the compressor. The compressed air stream then passes through a water coalescer which removes excess moisture from the compressed air stream. The air then passes through a thermostatically controlled heater and through a pressure regulator and enters a nitrogen module. Within the nitrogen module the compressed air passes through hollow, selectively permeable membrane fibers and oxygen, moisture and other sweep gases are separated from the compressed air stream to produce a stream of substantially pure nitrogen. Down stream of the nitrogen module, the nitrogen stream passes through a flow restrictor which maintains back pressure on the module and controls the rate of flow of nitrogen gas. The compressor, after-cooler, water coalescer, heater, nitrogen module and flow restrictor are all mounted in fixed relative functional relation within a cabinet with an integrated chassis. The cabinet is provided with a suitcase-type handel on its top by which the nitrogen source may easily be lifted and transported from one work site to another.

Other objects, advantages and aspects of the invention will become apparent upon reading the following detailed description and claims and upon reference to the accompanying drawings.

DETAILED DESCRIPTION OF THE INVENTION

Figure 1:
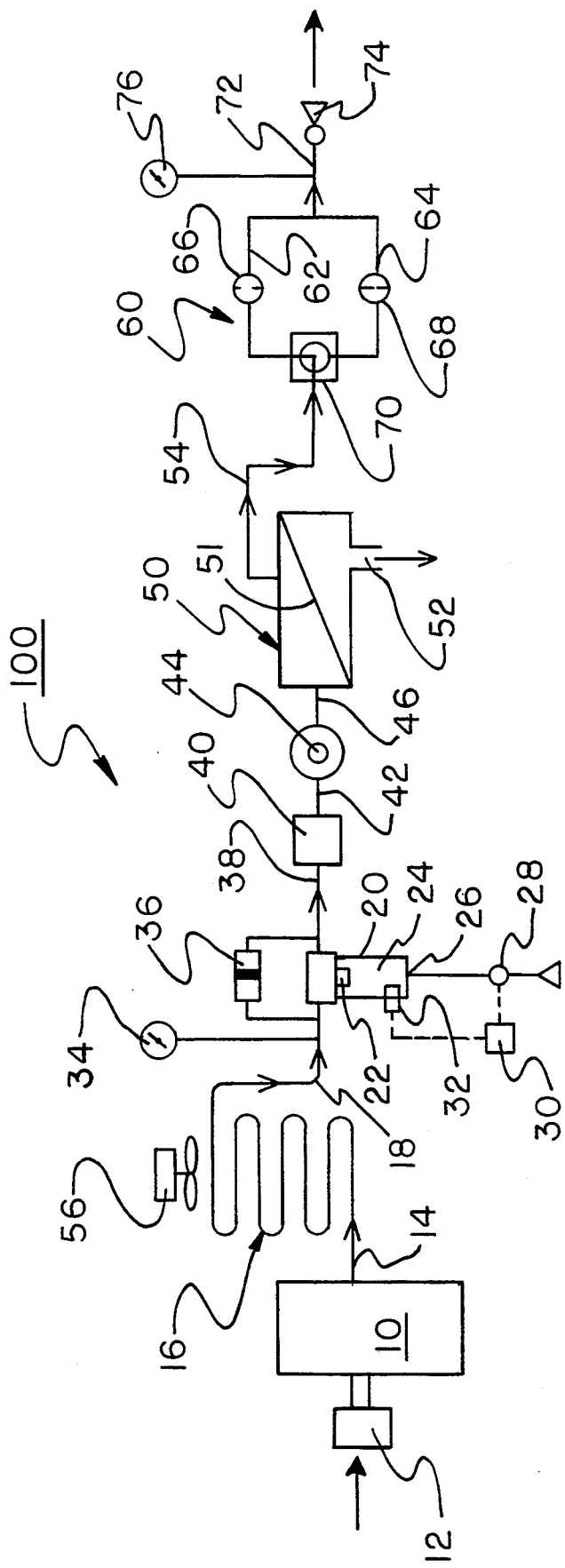
FIG. 1 is a schematic drawing of a nitrogen source comprising a preferred embodiment of the present invention.

Nitrogen source 100 comprising a preferred embodiment of the present invention is shown in schematic in FIG. 1 and includes compressor 10 which draws air from the ambient atmosphere through air filter 12. Compressor 10 is preferably an oilless, reciprocating type compressor. A compressed air stream produced by compressor 10 flows through conduit 14 to enter and flow through after-cooler 16 in which the stream of compressed air is cooled by heat exchange with the ambient atmosphere.

From after-cooler 16, compressed air flows through conduit 18 and into and through water coalescer 20 which removes excess water from the compressed air. As the compressed air flows through coalescer 20, excess moisture coalesces on the surface of coalescer element 22 and flows to the bottom of coalescer canister 24 from which it is periodically purged through drain 26 by opening of valve 28.

Valve 28 of nitrogen source 100 comprising the preferred embodiment is a solenoid valve which is caused to open by electronic controller 30 in response to a signal from liquid sensor 31 indicating that the level of liquid in canister 24 has risen to the level of liquid sensor 32. Sensor 32 may be, for example, a float or photo-electric liquid sensor. Gauge 14 is provided to monitor pressure in conduit 18 upstream of coalescer 20. Coalescer element 22 may also provide particulate filtration. Differential pressure gauge 36 provides an indication of the pressure drop over coalescer element 22. An increasing pressure drop over element 22 may indicate plugging of element 22 by water and/or particulate materials. Demoisturized compressed air leaving coalescer 20 flows through conduit 38 and enters heater 40. Heater 40 includes a heating element controlled by a thermostat to raise the temperature of the compressed air stream as it leaves heater 40 to a preferred range, for example, of the order of 115 degrees Fahrenheit, to maximize the performance of nitrogen module 50 and reduce the relative humidity of the compressed air stream. From heater 40, the compressed air flows through conduit 42, pressure relief valve 44 and conduit 46 to enter nitrogen module 50. Pressure relief valve 44 of nitrogen source 100 comprising the preferred embodiment is a diaphragm style relief valve which relieves pressure upstream of nitrogen module 50 and downstream of compressor 10 when the pressure exceeds a pressure of, for example, 175 psi, to protect the integrity of the selective permeability membrane hollow fibers within module 50 and prevent activation of pressure release devices of compressor 10.

The selective permeability membrane 51 of the walls of the hollow fibers within nitrogen module 50 generally constrain the nitrogen gas of the compressed air stream within the hollow fibers while allowing oxygen, moisture, carbon dioxide and other sweep gases to permeate through the membrane wall much more rapidly than the nitrogen. These sweep gasses are then expelled through module vent 52. Nitrogen gas thus flows through the fibers and from module 50, through conduit 54, restriction assembly 60 and conduit 72 to nitrogen port 74. The purity of the nitrogen gas arriving at port 74 will depend upon the back pressure provided by restrictor assembly 60, which determines the differential pressure over the fiber walls and the dwell time of the gas stream within the module.

Gauge 76 is provided to indicate the pressure of nitrogen gas in conduit 72 so that an increase in back pressure or reduction of back pressure caused by apparatus to which port 74 may be attached for a particular application can be monitored. Gauges 34 and 76 of the preferred embodiment are preferably oil filled gauges to stabilize gauge needles and minimize difficulty in reading gauges 74 and 76 in environments in which nitrogen source 100 is subject to vibration.

Figure 2:
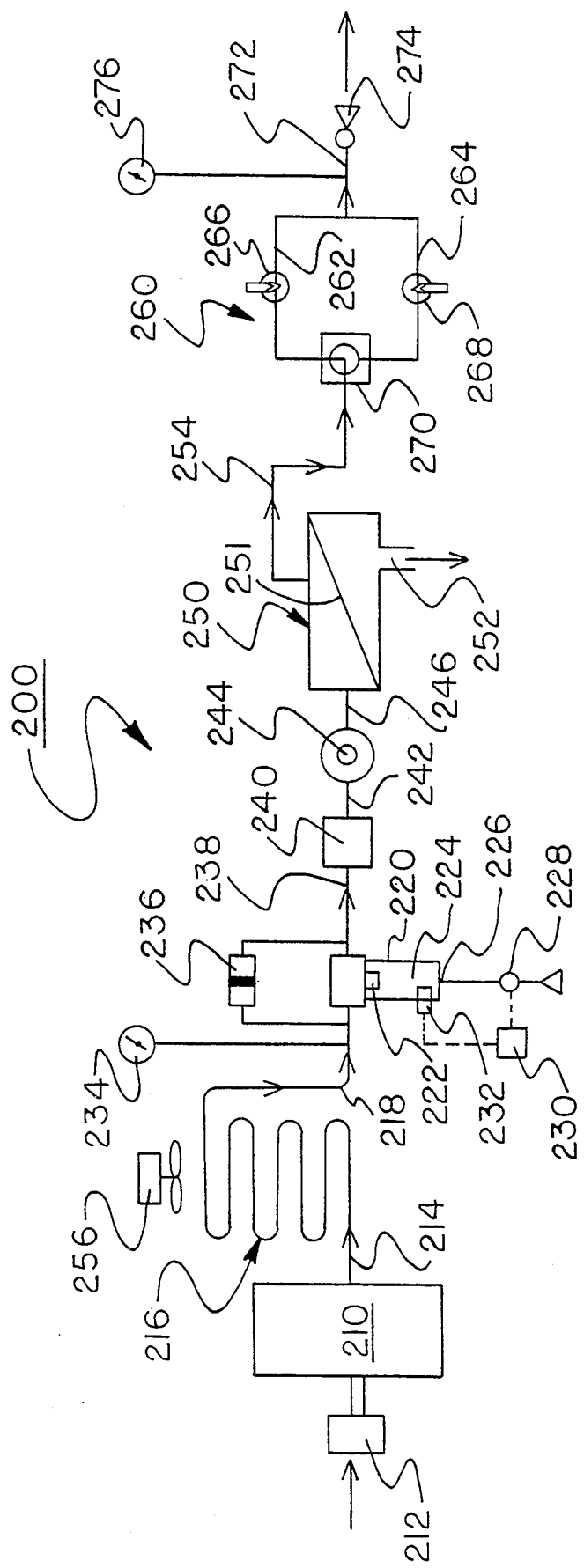
FIG. 2 is a schematic drawing of a nitrogen source comprising an alternative embodiment of the present invention.

Restrictor assembly 60 of nitrogen source 100 comprising the preferred embodiment is a bimodal restrictor and includes two gas passages, 62 and 64, and selector valve 70 having a first position in which gas flow is directed through passage 62 and a second position in which gas flow is directed through gas passage 64. Restriction elements 66 and 68, which restrict gas flow and provide back pressure to differing extends, are located in passages 62 and 64, respectively. Thus, an operator may chose between two nitrogen flow rates and corresponding purities by placing selector valve 70 in the appropriate position. In the embodiment of FIG. 1, restriction elements 66 and 68 are, for example, orifice plates with orifices of different size. Nitrogen source 200 comprising an alternative embodiment of the present invention is shown in FIG. 2 in which elements similar to those of the embodiment of FIG. 1 are similarly numbered. In the alternative preferred embodiment of FIG. 2 restriction elements 266 and 268 of nitrogen source 200 are valve type restrictor devices which allow calibration adjustment of the purity of nitrogen produced by nitrogen source 200 when selector valve 270 is in each of its positions during manufacture of nitrogen source 200 to provide selection of nitrogen of two known, predetermined purities when nitrogen source 200 is operated against a standard back pressure range at port 74. For example, nitrogen source 200 may be calibrated to provide 95 percent or 98 percent pure nitrogen of a dew point of 70 degrees below zero or less Fahrenheit at back pressures up to 175 psi at port 274 when selector valve 270 is in its first or second position, respectively.

Figure 3:
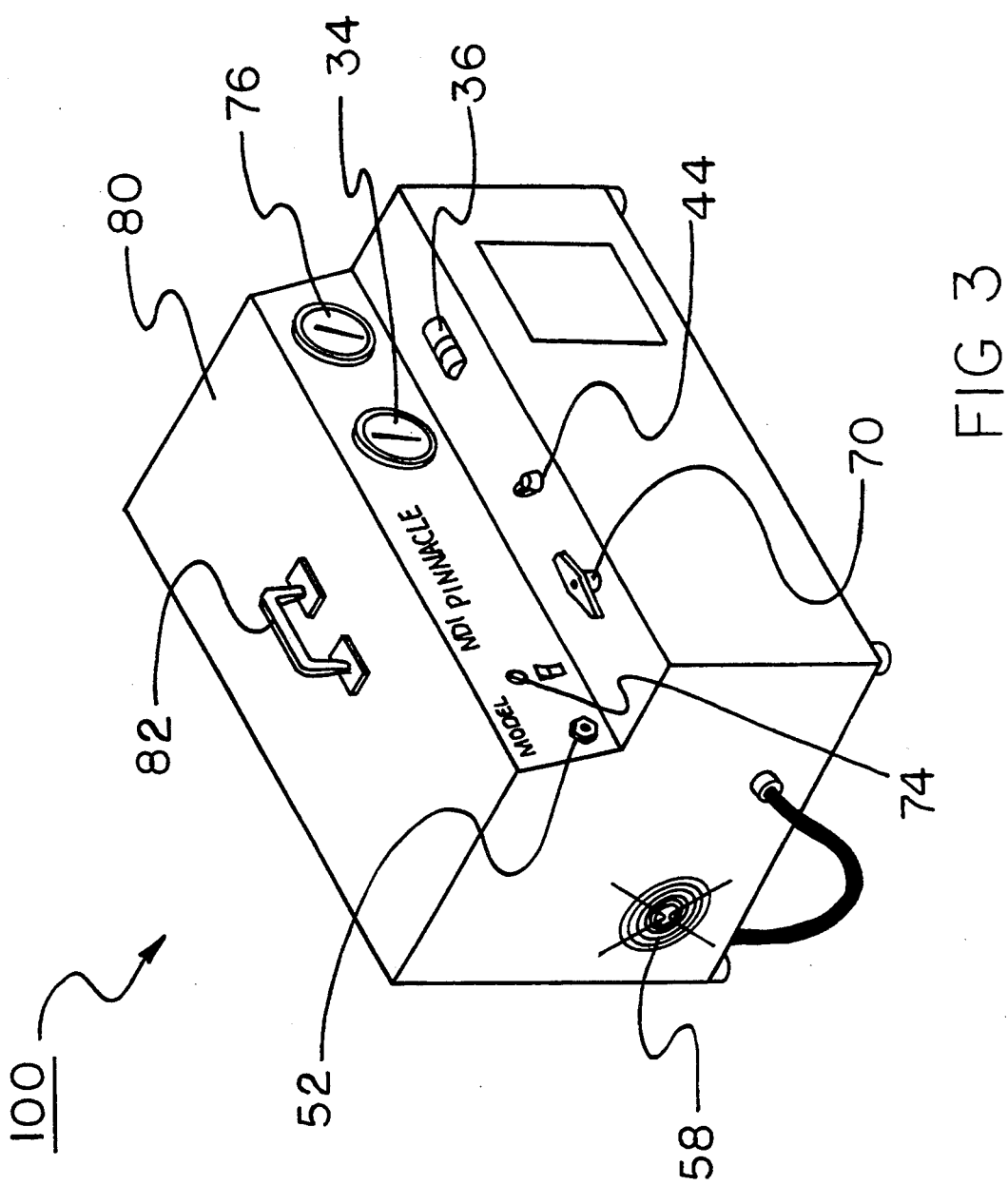
FIG. 3 is a pictorial drawing, in perspective, of a nitrogen source comprising a preferred embodiment of the present invention.

As may be seen in FIG. 3, the above described elements of nitrogen source 100 are mounted within integrated chassis and cabinet 80. Fan 56 is also mounted within cabinet 80 and is positioned to augment cooling of compressed air in after-cooler 16, provide general cooling for components of nitrogen source 100, and to provide ventilation of cabinet 80 to assure sweep gases cannot accumulate within cabinet 80 by blowing ambient atmospheric gas within cabinet 80 across after-cooler 16 and out vent 58 of cabinet 80. Fan 56 is preferably provided with a thermostatic switch to turn fan 56 off when the temperature within cabinet 80 is too low for efficient operation of the apparatus components. For example, fan 56 may be deenergized should the temperature within cabinet 80 fall below 45 degrees Fahrenheit, and, once deenergized, reenergized should the temperature within cabinet 80 rise above 70 degrees Fahrenheit.

Nitrogen source 100 is sized to provide useful volume flows of nitrogen gas and to be easily transported in a service vehicle. For example, nitrogen source 100 may provide a flow of nitrogen of a selected purity of 1 cubic foot per minute at back pressures up to 175 psi at port 74, weigh about 60 pounds, and have a cabinet volume of about three cubic feet. Cabinet 80 is provided with carrying handle 82 to facilitate lifting and transporting nitrogen source 100 from one work site to another.

While an exemplary nitrogen source comprising a preferred embodiment of the present invention has been shown, it will be understood, of course, that the invention is not limited to that embodiment. Modification may be made by those skilled in the art, particularly in light of the foregoing teachings. It is, therefore, contemplated by the appended claims to cover any such modification which incorporates the essential features of this invention or which encompasses the spirit and scope of the invention.

We claim:

1. An apparatus for providing nitrogen gas at sequential work sites comprising:
   a channel with constraining walls for containing flowing nitrogen gas at a pressure greater than ambient atmospheric pressure, said channel having an upstream end and a down stream end;
   a compressor for providing compressed air at a pressure greater than atmospheric pressure to said upstream end of said channel;
   a membrane wall portion of said channel between said upstream end and said downstream end, said constraining wall of said membrane wall portion comprising a membrane for selectively constraining nitrogen within said channel while allowing another gas to pass through said membrane and without said channel;
   a cabinet for containing said compressor and said channel in fixed, relative, functional relation;
   transport facilitation means for facilitating transport of said cabinet from a first of the work sites to a second of the work sites;
   a bifurcated channel section with a first and second bifurcated section passage;
   a first flow restrictor located within said first bifurcated section passage;
   a second flow restrictor located within said second bifurcated section passage; and,
   valve means for selectively directing a flow of gas through said first or said second passage.

2. A nitrogen gas providing apparatus as in claim 1 in which said first and second flow restrictors each comprise an orifice.

3. A nitrogen gas providing apparatus as in claim 1 in which said first and second flow restrictors each comprise valve means for adjustabley restricting a flow of gas.

4. A nitrogen gas source for supplying nitrogen gas at sequential work sites comprising:
   compressor means for compressing ambient atmospheric air;
   after-cooler means for cooling a stream of compressed air flowing from said compressor means;
   water coalescer means for removing water from a stream of compressed air flowing from said after-cooler means;
   heater means for heating a stream of compressed air flowing from said water coalescer means;
   nitrogen module means for separating oxygen and water from a stream of compressed air flowing from said heater means to discharge a stream of substantially pure nitrogen;
   chassis means for maintaining said compressor means, after-cooler means, water coalescer means, heater means and nitrogen module means in fixed relative working relation, one to another,
   pressure regulator means for maintaining the pressure of gas entering said nitrogen module means within a predetermined pressure range; and,
   a bimodal restriction means having alternative first and second selectable restriction modes for restricting the flow of the nitrogen stream from said module means.

* * * * *